(12) United States Patent
Pfister (10) Patent No.: US 8,453,804 B2
(45) Date of Patent: Jun. 4, 2013

(54) DISC BRAKE SYSTEM

(75) Inventor: Karl Gerhard Pfister, Thorndale (CA)

(73) Assignee: 2040422 Ontario Inc., Dorchester, Ontario (CA)

( * ) Notice: Subject to any disclaimer, the term of this patent is extended or adjusted under 35 U.S.C. 154(b) by 1023 days.

(21) Appl. No.: 11/577,010

(22) PCT Filed: Oct. 11, 2005

(86) PCT No.: PCT/CA2005/001552
§ 371 (c)(1),
(2), (4) Date: Apr. 11, 2007

(87) PCT Pub. No.: WO2006/039794
PCT Pub. Date: Apr. 20, 2006

(65) Prior Publication Data
US 2008/0093180 A1    Apr. 24, 2008

(30) Foreign Application Priority Data
Oct. 12, 2004  (CA) .................................... 2484405

(51) Int. Cl.
*F16D 55/00*  (2006.01)
*F16D 65/38*  (2006.01)

(52) U.S. Cl.
USPC ................. 188/73.32; 188/73.31; 188/218 R; 188/73.1

(58) Field of Classification Search
USPC .......... 188/73.31, 73.32, 73.35, 73.36, 73.37, 188/218 R, 218 XL, 71.7, 73.1, 206 R
See application file for complete search history.

(56) References Cited

U.S. PATENT DOCUMENTS

| 2,356,258 | A | * | 8/1944 | Martin | 188/72.4 |
| 4,019,611 | A | * | 4/1977 | Ritsema | 188/73.45 |
| 4,144,953 | A | | 3/1979 | Johnson | |
| 4,535,873 | A | * | 8/1985 | Airheart | 188/72.4 |
| 4,537,289 | A | * | 8/1985 | VonGrunberg et al. | 188/72.4 |
| 4,638,894 | A | | 1/1987 | Sitabkhan | |
| 4,830,149 | A | * | 5/1989 | Giering | 188/71.9 |
| 5,480,847 | A | * | 1/1996 | Derriman et al. | 501/128 |

(Continued)

FOREIGN PATENT DOCUMENTS
DE    4036272 A1 *  5/1992
DE    43-24-988 A1   2/1995
(Continued)

OTHER PUBLICATIONS
Machine translation of DE'272.*
(Continued)

*Primary Examiner* — Melody Burch (57) ABSTRACT

There is disclosed a disc brake system incorporating a split caliper having a first caliper half integrally formed with a mounting plate for mounting the caliper on a vehicle. A second caliper half is fixedly and removably attached to the first caliper half in spaced apart relation to provide room for a rotor to be disposed between the caliper halves. The joiner plates permit adjustment of the distance between the caliper halves to accommodate rotors of different thickness. The split design provides a slimmer caliper profile permitting the use of larger diameter rotors in the same space. A splined rotor carrier permits mounting of the rotor on to a wheel hub housing having a corresponding spline. The disc brake system of the present invention is particularly useful in retrofitting existing vehicles, especially light armored vehicles (LAV's).

23 Claims, 8 Drawing Sheets

U.S. PATENT DOCUMENTS

| | | | | |
|---|---|---|---|---|
| 5,538,105 | A * | 7/1996 | Rike | 188/73.32 |
| 5,551,538 | A | 9/1996 | Null | |
| 6,019,199 | A * | 2/2000 | Heidenreich | 188/73.34 |
| 6,068,091 | A * | 5/2000 | Finley | 188/73.31 |
| 6,186,291 | B1 | 2/2001 | Barnard | |
| 6,302,243 | B1 * | 10/2001 | Ruiz | 188/73.1 |
| 6,488,132 | B2 | 12/2002 | Matsuishi | |
| 6,508,338 | B1 * | 1/2003 | Bunker | 188/72.1 |
| 6,945,367 | B1 * | 9/2005 | Yuhas | 188/18 R |
| 7,438,161 | B2 * | 10/2008 | Burgoon et al. | 188/73.32 |
| 2004/0222050 | A1 | 11/2004 | Beringer | |

FOREIGN PATENT DOCUMENTS

| | | |
|---|---|---|
| DE | 195-30-407 A1 | 2/1997 |
| EP | 0498423 A1 | 8/1992 |
| EP | 0887572 A1 * | 12/1998 |

OTHER PUBLICATIONS

Eaton Corporation, Airflex Caliper Disc Brakes Product Sheet H, 1997 (downloaded from http://airflex.com/Catalog/product_guide_H.htm on Jan. 9, 2008).

* cited by examiner

DISC BRAKE SYSTEM

FIELD OF THE INVENTION

The present invention relates to disc brakes for vehicles. In particular, the present invention relates to calipers for disc brakes and disc brake systems retrofittable into existing wheels to replace drum brake assemblies. The present invention also relates to methods of retrofitting brake systems on to existing vehicles.

BACKGROUND OF THE INVENTION

Two widely used types of brake systems for vehicles are drum brake systems and disc brake systems. Drum brakes work by pressing a brake shoe against the inside circumferential surface of a wheel rim to retard rotation of the wheel. In a disc brake system, rotation of a brake disc or brake rotor mounted on the vehicle's axle is retarded when a caliper presses a pair of brake pads against opposite sides of a rotating brake rotor. Drum brake systems are not as effective and are more prone to failure and wear than disc brake systems, therefore, it would be especially advantageous to be able to replace existing drum brake systems with disc brake systems. However, vehicles with drum brakes impose constraints on the size and design of any replacement disc brakes that may be used since the entire disc brake must be housed within the wheel rim. With current disc brake systems, the wheel rim constrains the diameter of the brake rotor to an inefficient size since a large amount of space must be left around the rotor to accommodate the caliper.

Thus, there is a need in the art for a disc brake system that can be used both in the construction of new vehicles and in the retrofitting of existing vehicles.

SUMMARY OF THE INVENTION

There is provided a caliper for a disc brake system comprising: a first caliper half integrally formed with a mounting plate for fixedly mounting the caliper on a vehicle proximal an axle of the vehicle; a second caliper half attached to the first caliper half, the second caliper half in spaced apart relation to the first caliper half to permit rotation of a brake rotor disposed therebetween; each caliper half having means for retaining brake pads; and each caliper half having means for engaging the brake pads against the rotor in response to a signal from a vehicle operator.

There is further provided a split caliper for a disc brake system comprising: a first caliper half and a second caliper half, the first caliper half not integrally formed with the second caliper half, the first caliper half in spaced apart relation to the second caliper half to permit rotation of a brake rotor therebetween, each caliper half having means for retaining brake pads, each caliper half having means for engaging the brake pads against the rotor in response to a signal from a vehicle operator; a joiner plate fixedly and removably attached to the first caliper half and second caliper half for joining the first caliper half to the second caliper half; and mounting means for fixedly mounting the caliper on a vehicle proximal an axle of the vehicle.

There is yet further provided disc brake system for a vehicle comprising: a caliper having a first caliper half and a second caliper half, the first caliper half not integrally formed with the second caliper half, the first caliper half in spaced apart relation to the second caliper half; one or more joiner plates fixedly and removably attached to the first caliper half and second caliper half for joining the first caliper half to the second caliper half; a mounting plate integrally formed with the first caliper half for fixedly mounting the caliper on the vehicle proximal an axle of the vehicle; a brake rotor disposed between the first caliper half and second caliper half, the brake rotor rotatable between the caliper halves, the brake rotor mounted on the axle, the brake rotor rotatable in response to rotation of the axle; and, brake pads mounted on each caliper half, each caliper half having means for engaging the brake pads against the rotor in response to a signal from a vehicle operator.

There is still yet further provided a method of retrofitting a brake system on an existing vehicle comprising the steps of: removing an existing drum brake system from an axle of the vehicle; mounting a first caliper half on to the vehicle proximal the axle by means of a mounting plate integrally formed with the first caliper half; fixedly and removably attaching a second caliper half to the first caliper half by means of a joiner plate so that the first and second caliper halves are in spaced apart relation; mounting a brake rotor on to a wheel hub housing so that the rotor rotates with the wheel hub housing; fixedly mounting the wheel hub housing on to the axle so that the brake rotor is disposed between the caliper halves, the caliper halves having brake pads mounted thereon and means for engaging the brake pads against the rotor in response to a signal from a vehicle operator; and, fixedly mounting a wheel rim on to the wheel hub housing.

Callipers and disc brake systems of the present invention are usable on any vehicle, particularly motorized vehicles, for example automobiles, trucks, buses, and military vehicles (e.g. jeeps, light armored vehicles, etc.). The calipers and disc brake systems are particularly useful for wheel stations on a light armored vehicle (LAV) from 5 to 22 ton GVW.

One of the advantages of the present calipers and disc brake systems is their use in retrofitting the brake systems of existing vehicles. Many vehicles employ drum brakes wherein brake shoes are pressed against the inside circumferential surface of a wheel rim to retard rotation of the wheel. Drum brake systems are not as effective and are more prone to failure and wear than disc brake systems, therefore, it would be especially advantageous to be able to replace existing drum brake systems with disc brake systems. However, vehicles with drum brakes impose constraints on the size and design of any replacement disc brakes that may be used since the entire disc brake must be housed within the wheel rim. With current disc brake systems, the wheel rim constrains the diameter of the brake rotor to an inefficient size since a large amount of space must be left around the rotor to accommodate the caliper. Calipers and brake systems of the present invention overcome this difficulty by providing a caliper of slimmer profile while increasing the strength and performance of the brake system. Disc brake systems employing the caliper design are lighter in weight and more compact while maximizing the diameter of the brake rotor and the space usage within the wheel rim.

Furthermore, retrofitting the present disc brake system to a vehicle has minimal impact on the mechanical drive train components. For example, for LAV GEN-I, II, III and IV, based on the MOWAG design, the only modified part of the original drive train is the housing of the planetary wheel hub. Additionally, the disc brake system is scalable to required performance criteria and the brake system is readily adaptable to vehicles of different weight and speed classes. The present brake system significantly reduces the unsprung mass of the vehicle wheel station thereby improving total mobility, even in amphibious environments.

Prior art attempts to retrofit disc brakes on to existing vehicles have been largely unsuccessful. Such disc brakes tend to be overloaded due to size and specific energies absorbed. As a result, fading, rotor warpage and cracking occur and brake performance in wet conditions is compromised.

Many of the benefits realized in the retrofitting of existing vehicles with the present disc brake system are equally applicable to the construction of new vehicles. For example, the compact size, light weight, strength and environmentally resistant design of the present caliper and disc brake system improves the performance of the brake and vehicle, even under extreme environmental conditions.

In one embodiment, a caliper of the present disc brake system comprises a first caliper half integrally formed with a mounting plate for fixedly mounting the caliper on a vehicle. Since the caliper is fixedly mounted to the vehicle, the caliper does not rotate with the wheel when the vehicle is in motion, therefore, calipers of the present invention are so-called "fixed calipers". Prior art fixed calipers are generally attached to a mounting plate by some kind of attachment means, for example bolts. In the caliper of the present invention, forming the first caliper half together with the mounting plate in one piece enhances the strength of the entire brake system. Without being limited to any particular theory of action, it is believed that the integrally formed mounting plate better distributed forces on the brake system thereby making the brake system more resistant to fatigue and material failure.

The mounting plate may be attached to any suitable part of the vehicle. Since the caliper and brake system are typically mounted on the vehicle at a wheel station proximal an axle, it is convenient to attach the mounting plate to the driveline and/or suspension assembly, preferably the suspension assembly, for example McPherson suspension, "torsion arm" suspension, etc. The mounting plate may be attached to the vehicle by any suitable means, for example bolts.

The mounting plate may be any suitable shape and configuration. A mounting plate having an aperture therein permits the caliper to be mounted to the vehicle at a number of places for additional strength while staying out of the way of the vehicle's axis. A mounting ring with a circular aperture is particularly suitable.

A second caliper half is attached to the first caliper half, the two caliper halves being in spaced apart relation to each other. In a typical fixed caliper design, the second caliper half is integrally formed from one piece with the first caliper half. In some cases, a caliper design in which the two caliper halves are integrally formed from one piece together with the mounting plate may be appropriate.

In a second embodiment of a caliper of the present invention, the caliper halves are formed of separate pieces and joined together fixedly and removably by a joiner plate in a so-called split caliper embodiment. The joiner plate may be attached to the caliper halves by any suitable means, for example bolts. Furthermore, the joiner plate may have notches in which the caliper halves are seated to help hold the caliper halves together. The caliper halves are shaped to direct pressure points towards the joiner plate, thereby improving performance. One or more joiner plates may be used. Using more than one joiner plate permits the use of thinner joiner plates thereby reducing the profile of the caliper. The use of two joiner plates is preferred.

In the split caliper embodiment, the joiner plate is removably attached to both caliper halves. Therefore it is possible to accommodate rotors of different thickness between the caliper halves by adjusting the distance between the caliper halves by attaching the caliper halves to the joiner plate at different places. Rotor thickness requirements are different on vehicles having different GVW ratings and/or wheel sizes.

Further, the split caliper embodiment is symmetrical permitting use of the brake system on either the left or right side of a vehicle. Yet further, the split caliper embodiment has a lower profile permitting larger diameter rotors to be used. Still further, the split caliper embodiment minimizes flex of the caliper halves when pressure is applied to the rotor, thereby improving the performance, extending the life and enhancing the safety of the brake system.

Thus, a caliper of the present invention may be a single integral piece including two caliper halves and a mounting plate. Or, it may be three separate pieces including two caliper halves joined together by a joining plate and a mounting plate attached to one of the caliper halves. Or, a caliper of the present invention may be two pieces, one piece being a first caliper half integrally formed with a mounting plate and the other piece being a second caliper half fixedly and removably attached to the first caliper half by a joiner plate.

The last case of the three alternatives in the previous paragraph is preferred since it combines the strength and other benefits offered by the integrally formed caliper half and mounting plate with the compactness and other benefits offered by the split caliper with joiner plate. Another benefit of the caliper design of the present invention is that the position of the caliper (and rotor) protects the brake system from cross-country obstacles, but is still open enough for visual inspection and easily accessible for maintenance. Furthermore, the position of the joiner plates helps scrape dirt, mud, snow, debris, etc. out of the wheel thereby reducing the chance of fouling the brake pads and/or rotor.

Fixed caliper components may be made of any suitable material, for example composite, aluminum or steel fabrications. Light-weight, durable, corrosion resistant alloys are preferred, in particular an aluminum alloy.

Each caliper half has means for retaining a disc pad. The pad may be mounted on the caliper half by any suitable means, for example, the caliper half may have an inset that supports the pad, the pad may be slidably mounted on a top cross rod, or both an inset and a cross rod may be used. In the disc brake system of the present invention, disc pads may be readily exchanged and may be visually inspected without disassembly of the brake system. Disc pads may be made of any suitable material. The material is generally custom matched to the rotor material by the rotor and pad manufacturer.

Each caliper half has means for engaging the brake pad against the rotor in response to a signal from a vehicle operator. Any suitable means may be used, for example one or more pistons that push the pads against the rotor. Preferably, each caliper half has three isolated pistons for a total of six isolated pistons in the caliper to distribute the braking forces. The pistons may be made of any suitable material, preferably a ceramic or a ceramic and aluminum combination. For example, Porsche uses an aluminum piston with ceramic end caps, which is particularly suitable in the present brake system. Piston ports are preferably environmentally sealed to keep out dirt, moisture and the like.

Pistons may be operative by any suitable means, for example, hydraulically, mechanically or electrically. Preferably, the pistons are operated hydraulically. Hydraulic fluid pressure lines may be incorporated into the caliper and may be fluidly connected to an actuating means, for example a brake pedal, in a control cockpit of the vehicle by one or more external pressure lines. Preferably, there is one fluid port per caliper half connecting the pressure lines in the caliper to external pressure lines. The calipers may also be equipped with upward facing brake "bleeding" ports and the calipers are designed so that the brake "bleeding" ports are readily accessible. Brake pads may also be equipped with wear sensors if desired.

The brake rotor or disc is generally circular in shape and a part of the rotor is always disposed between the caliper halves. The rotor is mounted on an axle of the vehicle, preferably by being mounted on a planetary wheel hub housing of the vehicle, and rotates with the rotation of the axle. Braking is accomplished when the pistons of the caliper push the brake pads against the rotor. Since the caliper is fixedly mounted on the vehicle, the brake pads retard the rotation of the rotor and thus the axle, thereby slowing the vehicle. The rotor may be made of any suitable material. Rotor materials are generally known in the art, for example gray cast iron, steel, Al-MMC, etc. Rotors are preferably wear resistant for long life, heat resistant for prevention of fading during multiple braking actions, and resistant to environmental factors. Preferably, the rotor is made of a carbon fibre reinforced ceramic material from, for example, SGL Brakes GmbH. Rotor thickness and diameter is dependent on the application. One of the advantages of the present disc brake system is that the caliper design can accommodate rotors of larger diameters and different thickness.

The rotor may be mounted on the axle by any suitable means. Preferably, a rotor carrier is used. The rotor carrier is preferably made in a light-weight design and from durable material, for example aluminum alloy, composites, etc. Preferably, the rotor carrier is circular having a central aperture. The rotor may be mounted on the rotor carrier by any suitable means, for example shear bolts. Mounting of the rotor on the rotor carrier is designed for load transfer of brake torque from carrier to rotor. The factors considered in the mounting design are: thermal loading on carrier from brake actions; electrochemical compatibility of rotor and rotor carrier; load transfer through bearing and clamping action of special hardware; and special hardware design.

The rotor carrier is adapted to be mountable on existing drive train elements, for example a planetary wheel hub housing, by mechanical interlock. Mechanical interlock may be achieved by any suitable method, for example by machining a fine spline into the planetary wheel hub housing to fit a spline of the rotor carrier, by matching grooves on the wheel hub housing with grooves on the rotor carrier, or by press fitting the wheel hub housing together with the rotor carrier. In a preferred embodiment, a central aperture of the rotor carrier is splined to fit to a corresponding fine spline machined into the wheel hub housing. The fit of the rotor carrier to the spline of the wheel hub housing is controlled with optimized fit tolerances. A mating spline connection between the rotor carrier and the wheel hub housing permits the rotor carrier to be mounted on an axle of the vehicle so that the rotor rotates with rotation of the axle.

The planetary wheel hub housing may be configured as an integrated design in which the rotor carrier or rotor carrier mount is integrally included on the planetary wheel hub. Alternatively, in a retrofit operation the planetary wheel hub housing may be an existing housing adapted to the present brake system by machining into it a fine spline fitted for the spline of the rotor carrier.

The spline connection with different degrees of press to slide fit, and the option to retrofit without welding onto existing machined parts is a significant advantage of the present brake system over prior art methods of retrofit or new build.

Once the brake system is assembled at a wheel station of the vehicle, a wheel rim may be fixedly mounted to the wheel hub housing, for example with the use of bolts. In a retrofit operation, the same wheel rim can be used since the wheel hub housing has not been overly altered. New rims may also be used. Rims are made of any suitable material, for example steel, aluminum, etc.

The brake system may also have means for heating the brake pads. For example, heating wires receiving current from the vehicle's battery may be embedded in the caliper and/or brake pads to heat the brake pads. The brake system may also have an ABS interface and/or a traction control interface for improved braking performance.

In the method for retrofitting a brake system on an existing vehicle, the order of the steps is not of particular importance, although certain steps logically must follow from certain other steps. Generally, the existing drum brake system is removed first, although it is possible to machine the spline into the existing wheel hub housing without actually installing the new disc brake system and then continue to use the original drum brake system until the end of its life. Once it is desired to replace the drum brakes, the drum brakes are removed from the wheel station proximal an axle of the vehicle and the new disc brake system installed. The disc brake system may be entirely assembled first and then installed on the vehicle, or the components of the disc brake system may be assembled in various pieces and the pieces assembled sequentially on to the vehicle.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1:
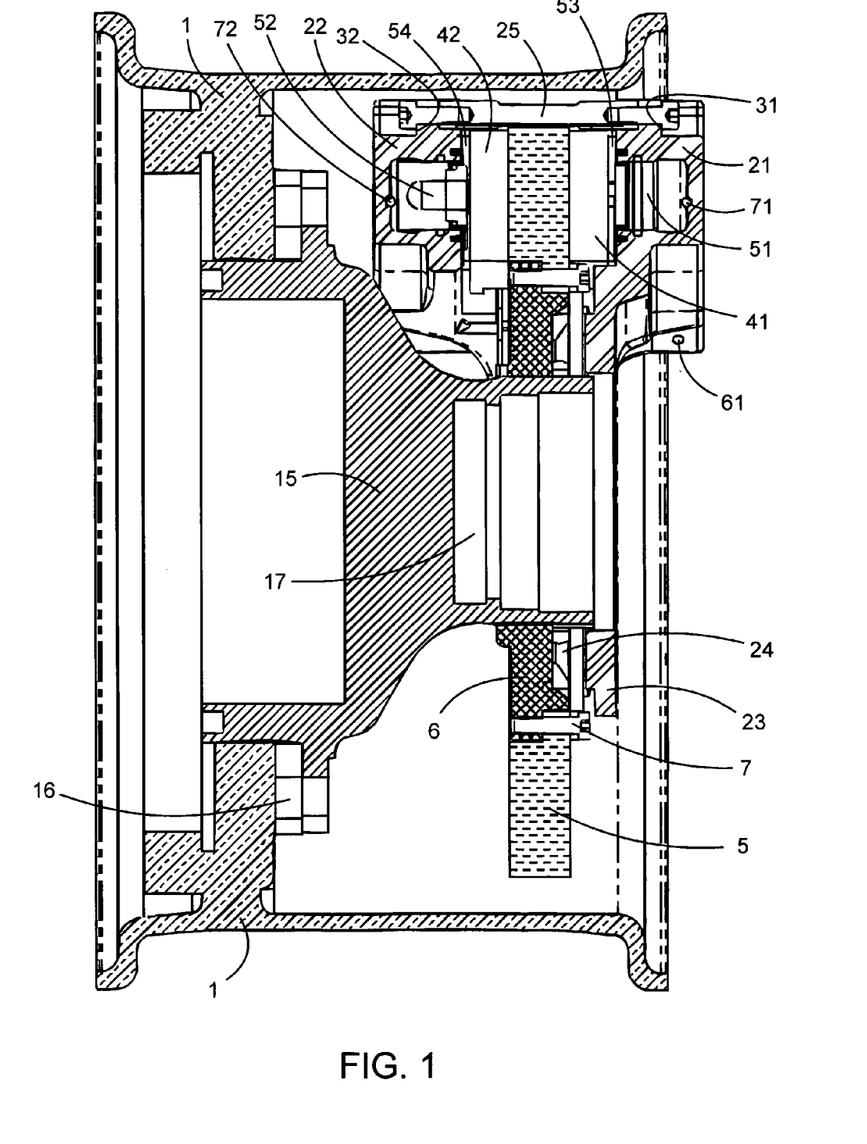
FIG. 1 is a side sectional view of an assembled disc brake system of the present invention housed in a wheel rim.

Referring to FIG. 1, a wheel rim 1 houses a disc brake system of the present invention. A circular rotor 5 is mounted on a circular rotor carrier 6 by bolts 7 (only one labeled). The rotor carrier 6 is in turn is mounted on a planetary wheel hub 15 by means of engaging splines on the rotor carrier 6 and the wheel hub 15. The wheel hub 15 is bolted to the wheel rim 1 with bolts 16 (only one labeled). An axle (not shown) is seated and held in wheel hub 15 at axle hub 17. The rotor is disposed between a first caliper half 21 and a second caliper half 22 of a split caliper design. The first caliper half 21 is integrally formed with a mounting ring 23 which is bolted to a vehicle's suspension (not shown) with bolts 24 (only one labeled). The suspension would be on the right side of the drawing page given the orientation of FIG. 1. The caliper halves 21,22 are joined together in spaced apart relation by two joiner plates, one of which is shown in FIG. 1 at 25. The joiner plate 25 has notches 31,32 to assist in holding the caliper halves together. Brake pads 41,42 mounted on the caliper halves are pushed against the rotor 5 by pistons 51, 52 in the caliper halves (only one piston per caliper half shown) in response to a signal from a vehicle operator. The pistons 51,52 are environmentally sealed with seals 53,54. Pressure lines 71,72 in caliper halves 21,22 respectively carry brake fluid to the pistons 51,52 respectively. First "bleeding" port 61 is a valve that permits air to escape from the first caliper half 21 when the brakes are "bled". There is a second "bleeding" port (not shown) on the second caliper half 22.

Figure 2:
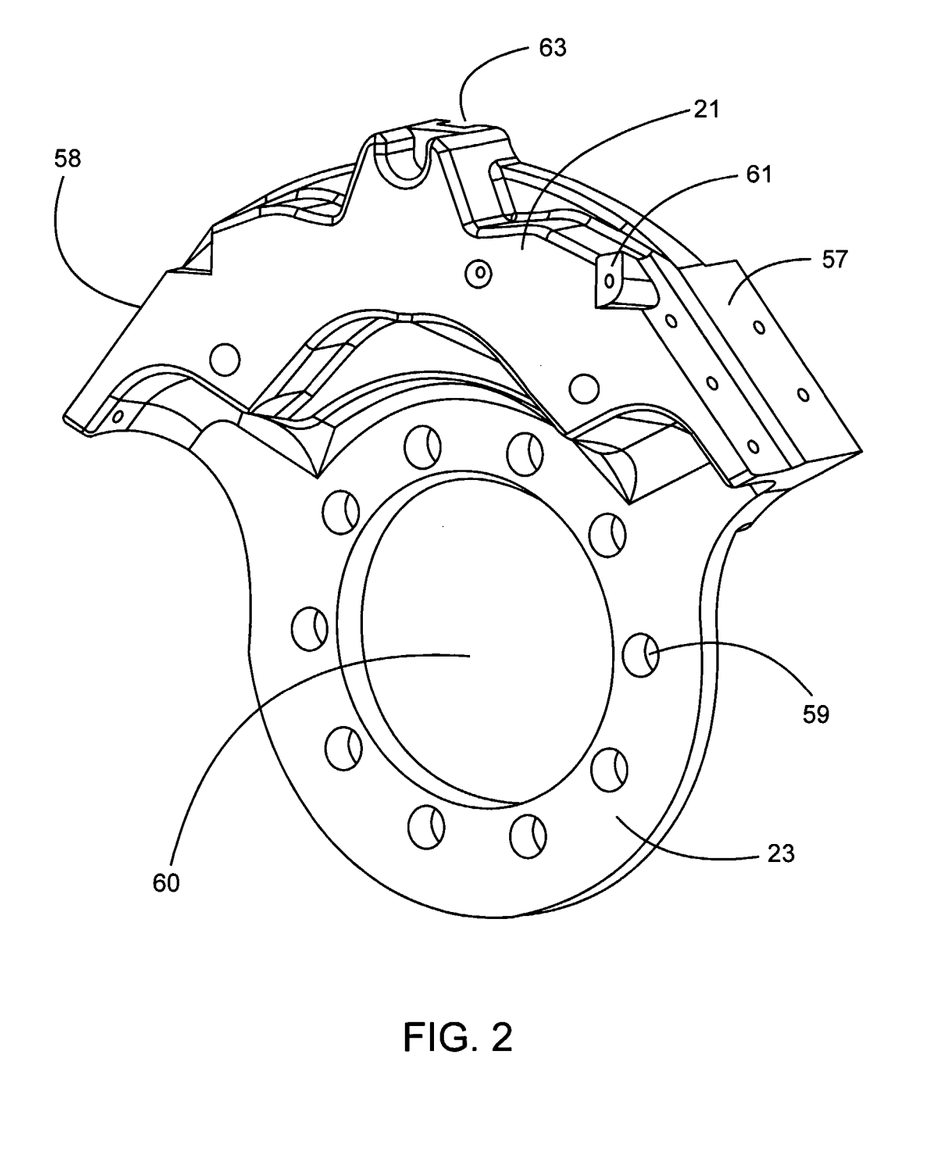
FIG. 2 is a perspective view of a first caliper half integrally formed with a mounting ring in accordance with the present invention.

Turning to FIG. 2, the first caliper 21 integrally formed with the mounting ring 23 is more clearly depicted in a rear perspective view. The first caliper half is shaped to direct pressure points towards the joiner plates (not shown) which are attached to the caliper half 21 at surfaces 57,58. The surfaces 57,58 are two sets of bolt holes so that the joiner plates can be attached at two different positions. Choice of attachment position depends on the thickness of the rotor. The mounting ring 23 has 10 bolt holes 59 (only one labeled) for bolting the mounting ring on to the suspension. The central aperture 60 provides room for the axle (not shown) to rotate freely. First "bleeding" port 61 is shown on the first caliper half 21. A depression 63 provides a place for a cross rod (not shown) to be bolted to the caliper half. The cross rod may be used to help support the brake pads (not shown). The second caliper half is similar in shape and construction to the first caliper half except that the second caliper half does not have an integrally formed mounting ring.

Figure 3:
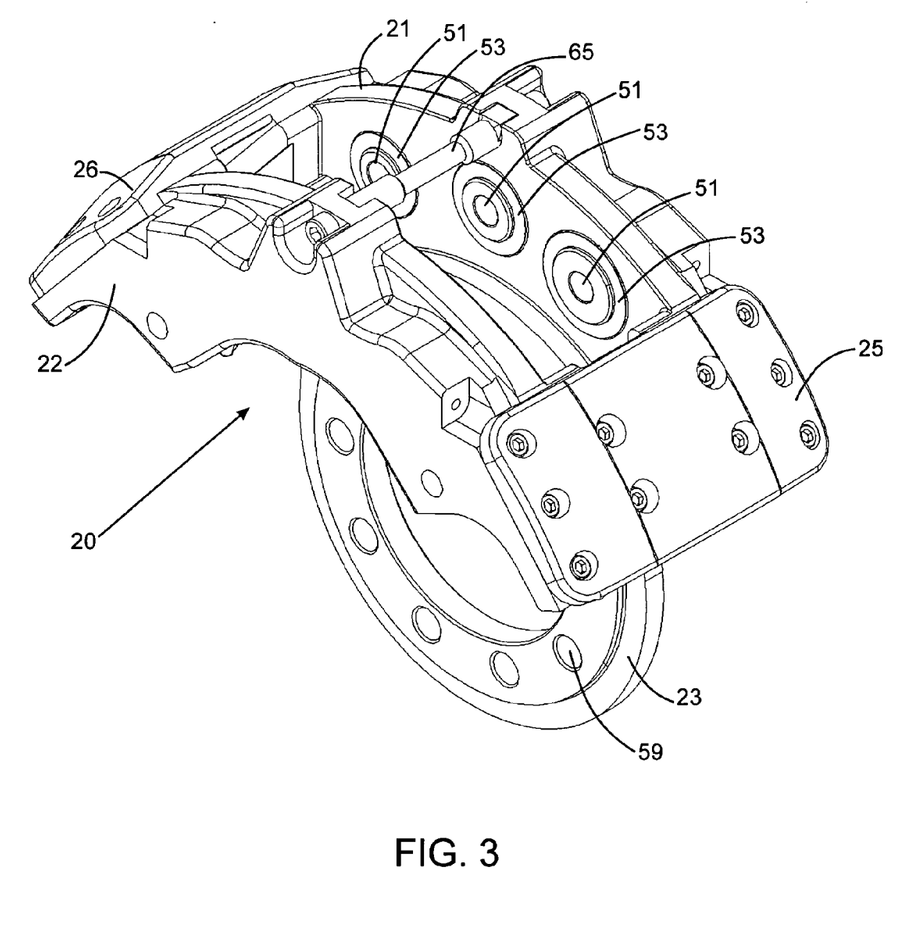
FIG. 3 is a perspective view of a caliper of the present invention.

Turning to FIG. 3, a caliper 20 is shown assembled in isolation. The first caliper half 21 and the second caliper half 22 are joined together in spaced apart relation by joiner plates 25,26. The joiner plates are well positioned to help scrape dirt and the like from the inside of the wheel rim top protect the workings of the brake system. The first caliper half 21 is shown with integrally formed mounting ring 23 having bolt holes 59 for bolting the caliper 20 to the suspension of the vehicle. The first caliper half has three pistons 51 sealed with environmental seals 53 for pushing against the brake pad (not shown). The second caliper half 22 has a similar set of three pistons and seals (not shown). A cross rod 65 is bolted to the caliper halves to provide help in supporting the brake pads. The second caliper half 22 is depicted with a fluid port 62 for allowing brake fluid to enter the internal pressure lines in the caliper half 22.

Figure 4:
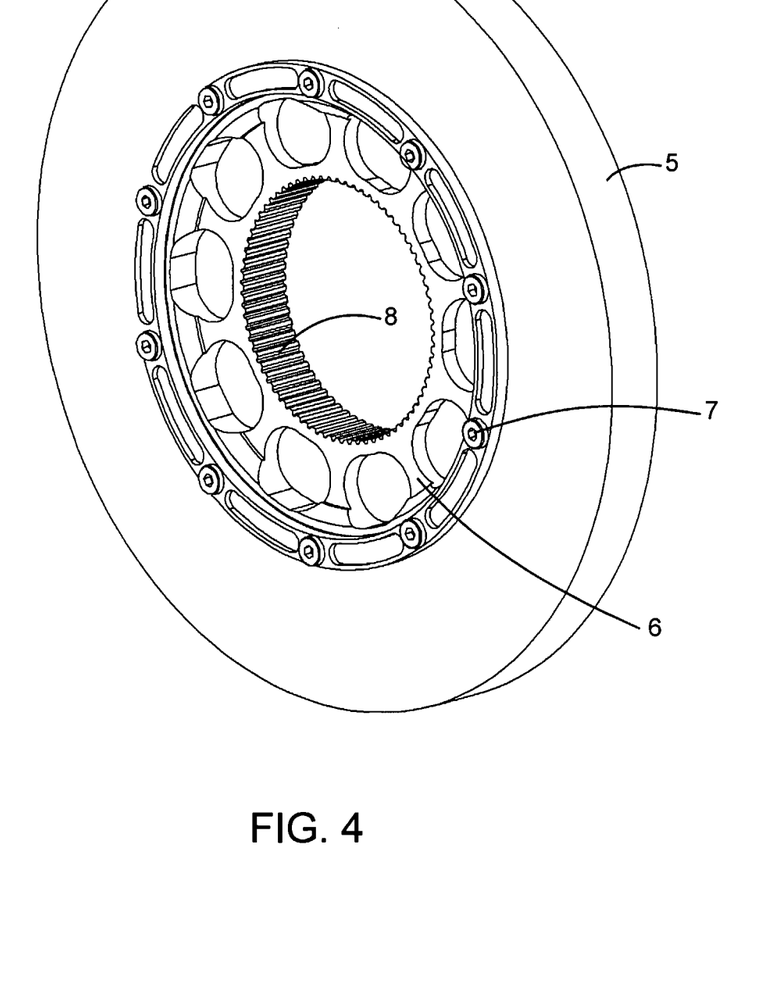
FIG. 4 is a perspective view of a rotor mounted on a rotor carrier in accordance with the present invention.

Turning to FIG. 4, the rotor 5 mounted to the rotor carrier 6 by 10 bolts 7 (only one labeled) is shown in isolation. The rotor carrier has a smaller diameter than the rotor. The rotor and rotor carrier are mounted together concentrically. The rotor carrier has a spline 8 machined into an inner surface of the rotor carrier, the inner surface defining a central aperture in the rotor carrier. The spline 8 is machined to cooperate with a corresponding spline of the wheel hub (not shown), which will be described in more detail with reference to FIGS. 6 and 7.

Figure 5:
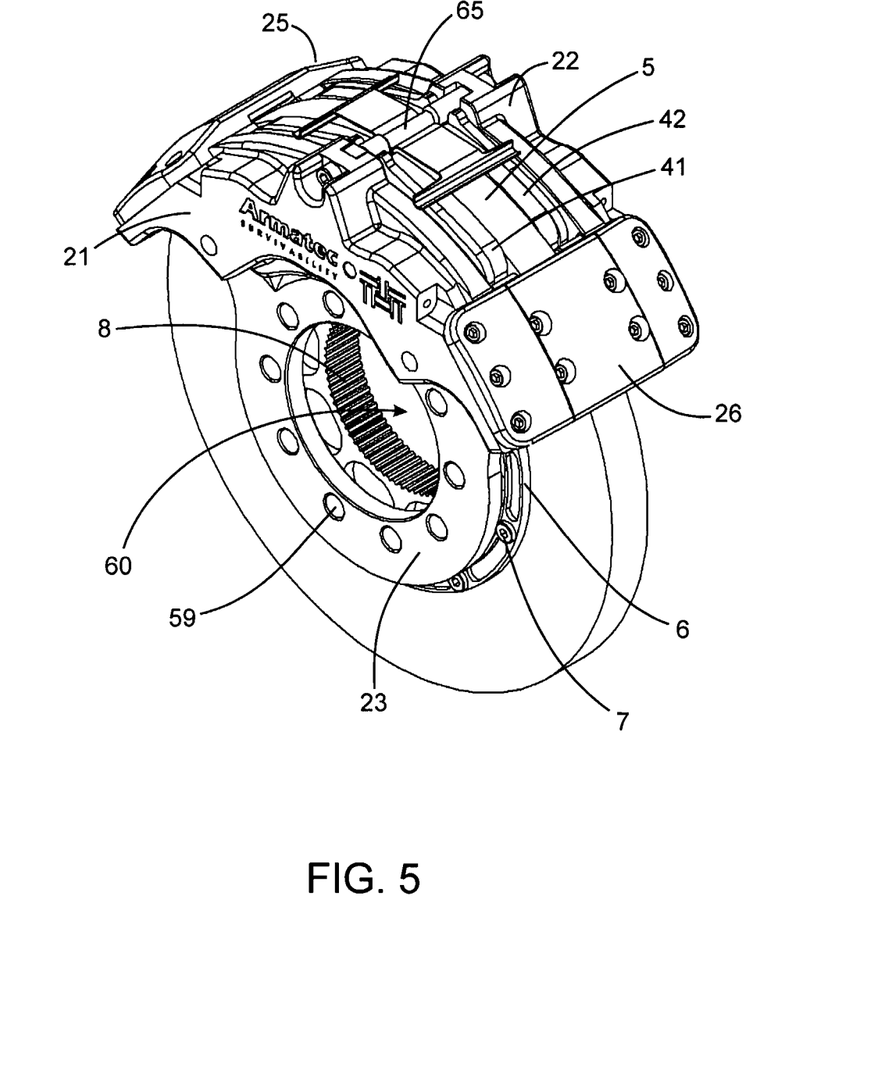
FIG. 5 is a perspective view of the caliper of FIG. 3 together with the rotor of FIG. 4.

Turning to FIG. 5, the caliper of FIG. 3 is shown in combination with the rotor of FIG. 4 in reverse orientation with respect to FIG. 3. Thus, the rotor 5 is disposed between the first caliper half 21 and the second caliper half 22. The first caliper half is integrally formed with mounting ring 23 and bolted to the suspension (not shown), now on the left side of the drawing sheet, through bolt holes 59 (only one labeled). The rotor 5 is bolted to the rotor carrier 6 by bolts 7 (only one labeled). The central aperture of the rotor carrier lines up concentrically with the aperture 60 of the mounting ring 23 to provide room for the axle (not shown) to protrude and rotate. The rotor carrier 6 is shown with spline 8. Joiner plates 25,26 join the caliper halves 21,22. Brake pads 41,42 are mounted on the caliper halves 21,22 and slidably mounted on the cross rod 65 next to the rotor 5.

Figure 6:
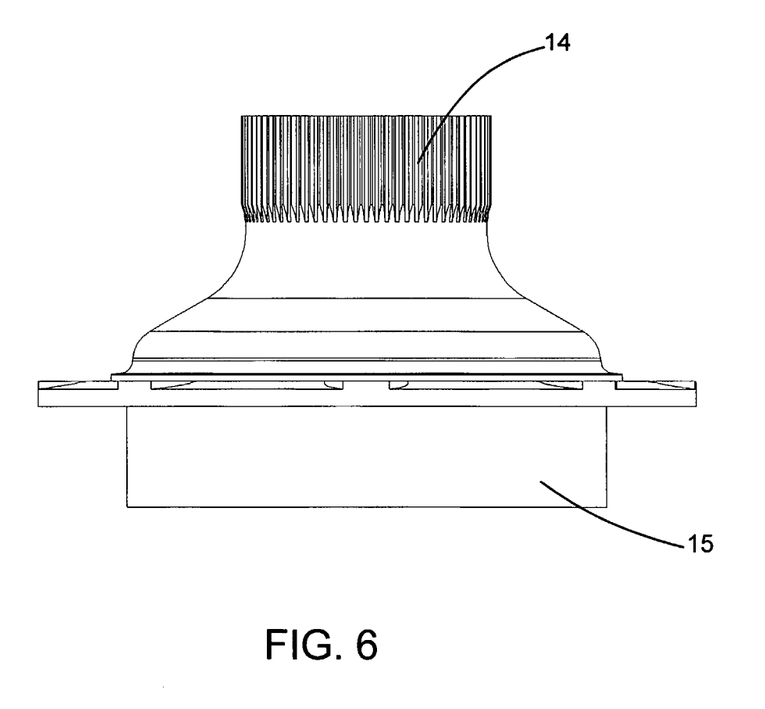
FIG. 6 is a side view of a planetary wheel hub housing.
Figure 7:
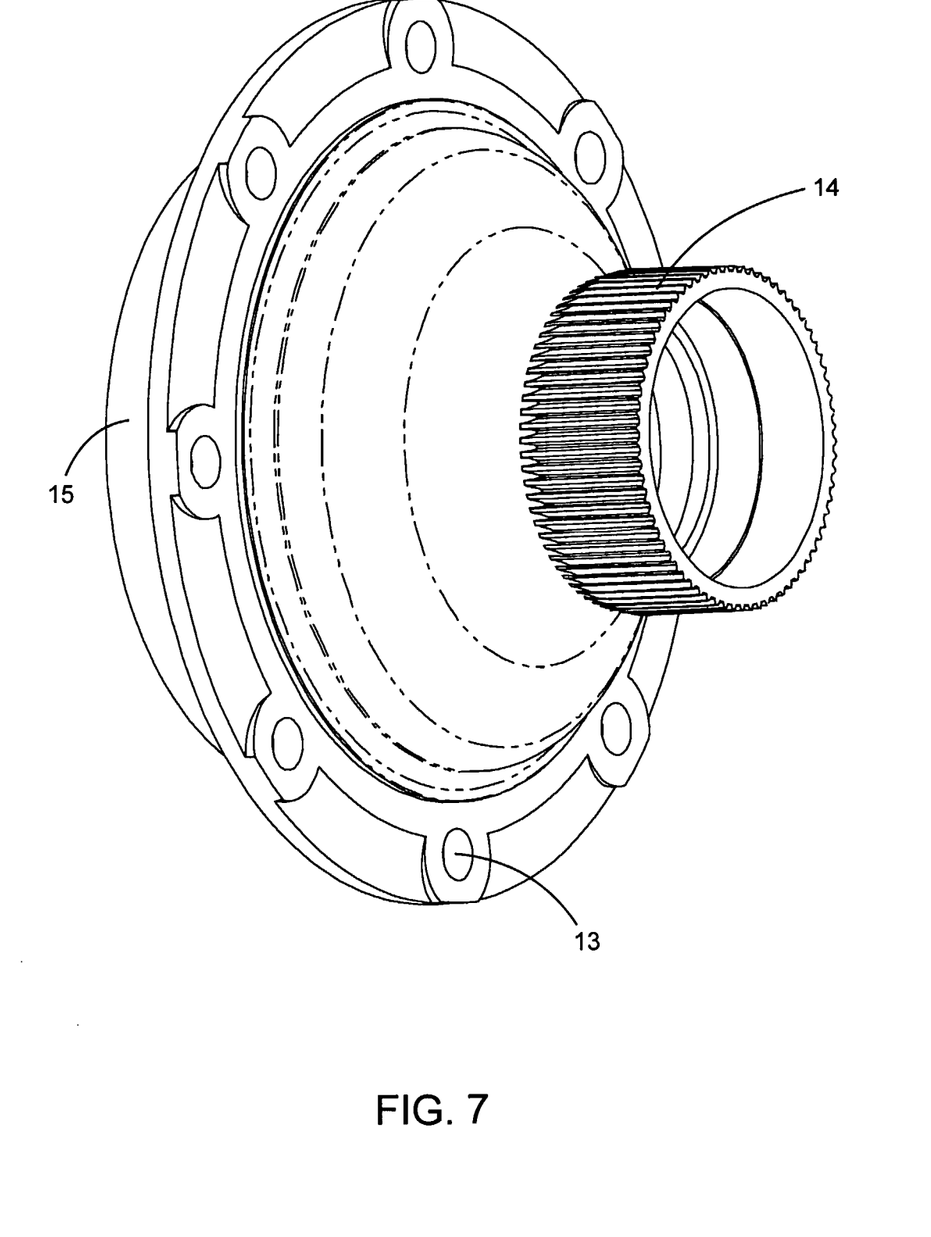
FIG. 7 is a perspective view of the planetary wheel hub housing of FIG. 6.

Turning to FIGS. 6 and 7 the planetary wheel hub 15 has a spline 14 machined therein. The spline 14 of the wheel hub and the spline of the carrier rotor (not shown) are machined to fit together. In operation the spline 14 of the wheel hub is seated in the spline of the rotor carrier so that the two splines intermesh and torque from the wheel hub generated by the rotating axle is transmitted to the rotor carrier to rotate the rotor with the axle. The wheel hub 15 is bolted to the wheel rim (not shown) through bolt holes 13 (only one labeled) which receive the bolts 16 (see FIG. 1).

Figure 8:
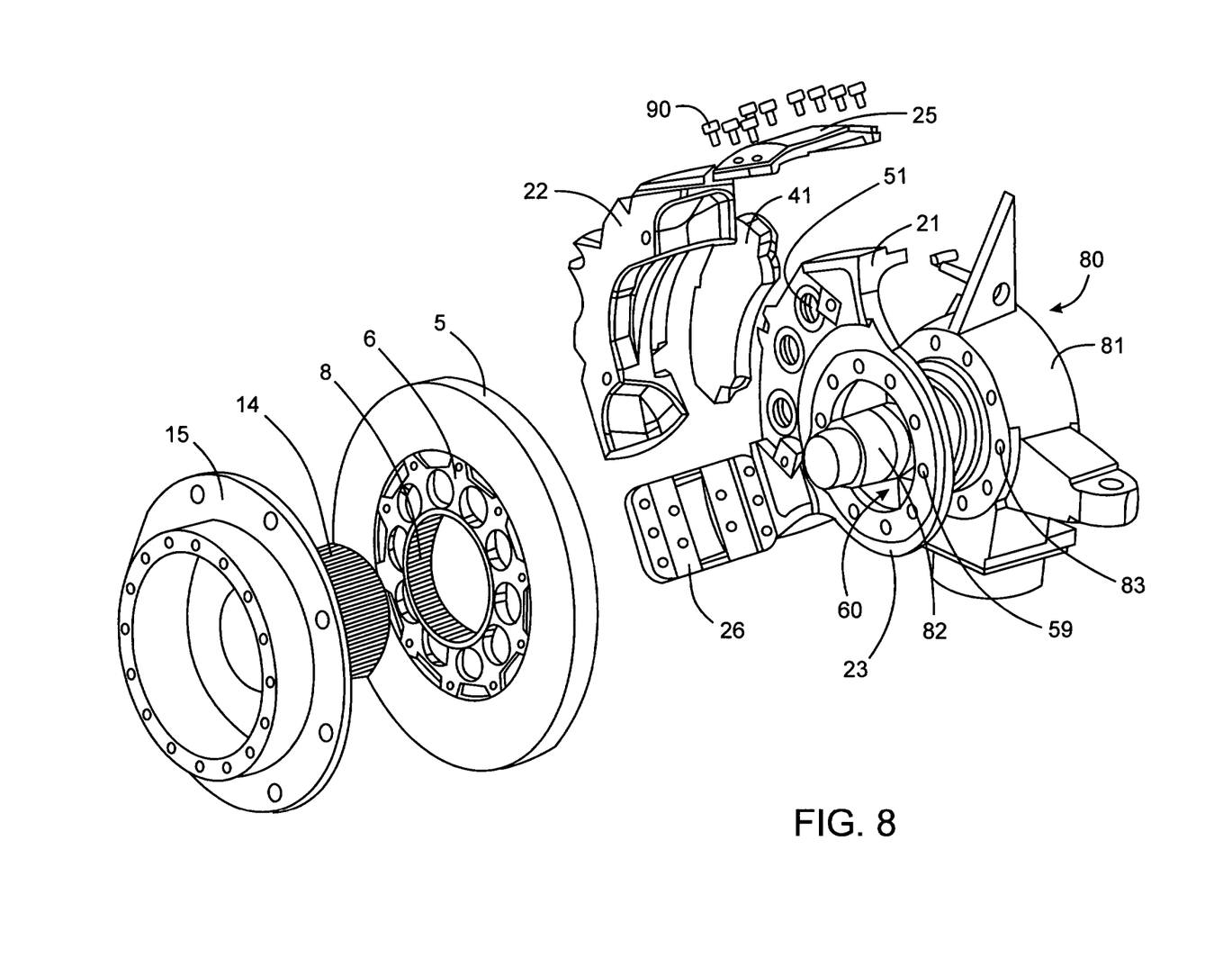
FIG. 8 is an exploded view of the disc brake system of FIG. 1.

Turning to FIG. 8, an exploded view of the brake system is shown in relation to a wheel station 80 comprising a suspension element 81 and an axle 82. The mounting ring 23 is bolted to the suspension element 81 through bolt holes 59 (only one labeled) on the mounting ring and bolt holes 83 (only one labeled) on the suspension element 81. The axle 82 protrudes the aperture 60 in the mounting ring and through the central aperture of the rotor carrier 6. The axle is seated in the axle hub of the wheel hub 15. The mounting ring 23 is integrally formed with the first caliper half 21 which has three pistons 51 (only one labeled) and a brake pad 41. The first caliper half 21 is joined to the second caliper half 22 by joiner plates 25,26 which are bolted to the caliper halves with bolts 90 (only one labeled). The spline 8 of the rotor carrier 6 is intermeshed with the spline 14 of the wheel hub 15. The rotor 5 is disposed between the caliper halves 21,22.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A caliper for a retrofittable disc brake system of a vehicle having an axle, comprising:
   a first caliper half;
   a second caliper half not integrally formed with the first caliper half, the second caliper half in spaced apart relation to the first caliper half to permit rotation of a brake rotor disposed therebetween;
   only one of the first and second caliper halves being integrally formed with a mounting plate for fixedly mounting the caliper on the vehicle proximal the axle;
   a brake pad retaining mechanism for retaining brake pads on each caliper half;
   a brake pad engaging mechanism for engaging the brake pads against the rotor on each caliper half;
   at least one joiner plate for connecting said second caliper half to said first caliper half in a spaced apart relationship, having a first attachment position on said at least one joiner plate for attachment to the first caliper half and second attachment positions on said at least one joiner plate distantly spaced from the first for selective attachment to the second caliper half;
   wherein the at least one joiner plate is fixedly and removably attached to the first caliper half and second caliper half at said first and second attachment positions to thereby permit attachment of the caliper halves at a plurality of spaced-apart distances to accommodate brake rotors having different thicknesses between the caliper halves.

2. The caliper of claim 1, wherein:
each caliper half is shaped to direct pressure points towards the at least one joiner plate.

3. The caliper of claim 1, wherein:
the plurality of spaced-apart distances is two spaced-apart distances.

4. The caliper of claim 1, wherein:
each caliper half has a height that defines a caliper height, and the at least one joiner plate has a thickness, such that the thickness does not increase the height of the caliper.

5. The caliper of claim 1, wherein:
the at least one joiner plate has notches in which the caliper halves are seated and the at least one joiner plate is attached to the caliper halves by bolts.

6. The caliper of claim 1, wherein:
the at least one joiner plate comprises two joiner plates.

7. The caliper of claim 1, wherein:
the mounting plate is provided with holes to permit bolting the mounting plate onto the vehicle.

8. The caliper of claim 1, wherein:
the mounting plate comprises a ring having a central aperture to provide space for the axle to rotate freely.

9. The caliper of claim 1, wherein:
the brake pad retaining mechanism comprises at least one of: an inset in each of the caliper halves, and a cross rod between the caliper halves.

10. The caliper of claim 1, wherein:
the brake pad engaging mechanism comprises one or more pistons.

11. The caliper of claim 10, wherein:
each piston is housed in an environmentally sealed piston port.

12. The caliper of claim 10, wherein:
each piston is hydraulically operated.

13. The caliper of claim 10, wherein:
each piston comprises a ceramic, or a combination of ceramic and aluminum.

14. Disc brake system for a vehicle having an axle, comprising:
a caliper according to claim 1;
the brake rotor disposed between the first caliper half and second caliper half, the brake rotor being rotatable between the caliper halves, the brake rotor being mounted on the axle, the brake rotor being rotatable in response to rotation of the axle; and,
the brake pads, mounted on each caliper half, the brake pads being engageable against the brake rotor by the brake pad engaging mechanism in response to a signal from a vehicle operator.

15. The brake system of claim 14, wherein the brake rotor is mounted on a rotor carrier, the rotor carrier is mounted on a wheel hub housing, and the wheel hub housing is mounted on the axle.

16. The brake system of claim 15, wherein the rotor carrier is mounted on the wheel hub housing by a mating spline connection.

17. The brake system of claim 14, wherein the rotor comprises a carbon fibre reinforced ceramic material.

18. A method of retrofitting a brake system on an existing vehicle comprising the steps of:
removing an existing drum brake system from proximal an axle of the vehicle;
providing a first caliper half and a second caliper half;
mounting only one of the first and second caliper halves on to the vehicle proximal the axle, by a mounting plate integrally formed with the one of the caliper halves;
fixedly and removably attaching the second caliper half to the first caliper half by at least one joiner plate having a first attachment position on said at least one joiner plate for attachment to the first caliper half and second multiple attachment positions on at least one said joiner plate distantly spaced from the first for selective attachment to the second caliper half, wherein the at least one joiner plate is fixedly and removably attachable to the first caliper half and second caliper half at said first and second attachment positions;
mounting a brake rotor on to a wheel hub housing so that the rotor can rotate together with the wheel hub housing;
fixedly mounting the wheel hub housing on to the axle so that the brake rotor is disposed between the caliper halves, the caliper halves having brake pads mounted thereon and brake pad engaging mechanisms for engaging the brake pads against the rotor in response to a signal from a vehicle operator; and,
fixedly mounting a wheel rim on to the wheel hub housing.

19. The method of claim 18, wherein the brake rotor is mounted on a rotor carrier, and the rotor carrier is mounted on the wheel hub housing by a mating spline connection.

20. A caliper for a retrofittable disc brake system of a vehicle having an axle, comprising:
a first caliper half integrally formed with a mounting plate for fixedly mounting the caliper on the vehicle proximal the axle;
a second caliper half not integrally formed with the first caliper half, the second caliper half in spaced apart relation to the first caliper half to permit rotation of a brake rotor disposed therebetween;
a brake pad retaining mechanism for retaining brake pads on each caliper half;
a brake pad engaging mechanism for engaging the brake pads against the rotor on each caliper half;
at least one joiner plate for connecting said second caliper half to said first caliper half in a spaced apart relationship, having a first attachment position on at least one said joiner plate for attachment to the first caliper half and a second attachment position on said at least one joiner plate distantly spaced from the first for attachment to the second caliper half;
at least one of the first and second attachment positions being defined by at least two distinct attachment structures engaging the at least one joiner plate, each of the distinct attachment structures corresponding to one of a plurality of spaced-apart distances between the caliper halves;
wherein the at least one joiner plate is fixedly and removably attached to the first caliper half and second caliper half at said first and second attachment positions to thereby permit attachment of the caliper halves at the plurality of spaced-apart distances to accommodate brake rotors having different thicknesses between the caliper halves.

21. The caliper of claim 20 wherein the at least two distinct attachment structures comprise at least two sets of bolt holes in a surface of at least one of the first and second caliper halves.

22. The caliper of claim 21 wherein the at least two distinct attachment structures further comprises bolts of the at least one joiner plate, with which the at least one joiner plate is bolted to at least one of the at least two sets of bolt holes in the surface of the at least one of the first and second caliper halves.

23. A method of retrofitting a brake system on an existing vehicle comprising the steps of:

removing an existing drum brake system from proximal an axle of the vehicle;

mounting a first caliper half on to the vehicle proximal the axle by a mounting plate integrally formed with the first caliper half;

fixedly and removably attaching a second caliper half to the first caliper half by at least one joiner plate having a first attachment position on said at least one joiner plate for attachment to the first caliper half and a second attachment position on said at least one joiner plate distantly spaced from the first for attachment to the second caliper half, at least one of the first and second attachment positions being defined by at least two distinct attachment structures engaging the at least one joiner plate, each of the distinct attachment structures corresponding to one of a plurality of spaced-apart distances between the caliper halves, wherein the at least one joiner plate is fixedly and removably attachable to the first caliper half and second caliper half at said first and second attachment positions;

mounting a brake rotor on to a wheel hub housing so that the rotor can rotate together with the wheel hub housing;

fixedly mounting the wheel hub housing on to the axle so that the brake rotor is disposed between the caliper halves, the caliper halves having brake pads mounted thereon and brake pad engaging mechanisms for engaging the brake pads against the rotor in response to a signal from a vehicle operator; and, fixedly mounting a wheel rim on to the wheel hub housing.

* * * * *